United States Patent [19]

Kusterer, Jr.

[11] 4,169,082

[45] Sep. 25, 1979

[54] FLAME RESISTANT LOW-SMOKE HOT MELT ADHESIVE

[75] Inventor: James E. Kusterer, Jr., Sedalia, Colo.

[73] Assignee: Johns-Manville Corporation, Denver, Colo.

[21] Appl. No.: 892,250

[22] Filed: Mar. 31, 1978

[51] Int. Cl.[2] .............................................. C08L 91/00

[52] U.S. Cl. .................................. 260/23 AR; 260/8; 260/28.5 AV; 428/441; 428/442; 428/514; 427/385 R

[58] Field of Search ............. 260/8, 28.5 AV, 23 AR; 428/441, 442, 514

[56] References Cited

U.S. PATENT DOCUMENTS

| | | | |
|---|---|---|---|
| 3,533,976 | 10/1970 | Eidman | 260/28.5 AV |
| 3,772,232 | 11/1973 | Hayes | 260/28.5 AV |
| 3,911,185 | 10/1975 | Wright, Jr. | 260/28.5 AV |

*Primary Examiner*—Melvyn I. Marquis

*Attorney, Agent, or Firm*—Robert M. Krone; Joseph J. Kelly; James W. McClain

[57] ABSTRACT

A flame resistant low-smoke hot melt adhesive composition, particularly useful for adhering facings to building products and thermal insulations, is disclosed. The composition consists essentially of, in parts by weight, 11–45 parts of high (at least 200° F.) melt point paraffin wax, 10–14 parts of halogenated (preferably chlorinated) microcrystalline or paraffin wax, 0.3–10 parts of halogen scavenger, 5–20 parts of a flame suppressant synergist, 5–20 parts of a low temperature resistant vapor barrier barrier elastomer, and 0.5–10 parts of smoke suppressant. Preferably the composition will also contain a carbon dioxide donor/filler. The material is not tacky when cold, can be readily reactivated by heating, and can be applied in discrete units.

25 Claims, No Drawings

FLAME RESISTANT LOW-SMOKE HOT MELT ADHESIVE

BACKGROUND OF THE INVENTION

The invention herein relates to adhesives. More particularly it relates to hot melt adhesives.

Wax based hot melt adhesives have been used for many years. It has also been common to incorporate into such adhesives a halogen donor (usually a donor of chlorine or bromine) to impart to flame retardancy to the adhesive. Typical hot melt adhesives have, however, suffered from several major limitations.

1. Hot melt adhesives containing flame retardant halogen chemicals (particularly chlorine chemicals) are unstable when held at high temperatures for extended periods because of dehydrohalogenation. For instance, adhesives held in the molten state at temperatures of about 300°-350° F. (150°-175° C.) for periods of more than six hours change from a molten to a gelled state and thus cannot be used as hot melts. This property severely limits the ability of the hot melt user to maintain large quantities of molten adhesive for extended periods and thus severely shortens the length of coating runs which can be obtained.

2. Among the most widely used flame retardants have been the chlorinated biphenyls. These chemicals have recently been identified as probable carcinogens and have been banned from use in many localities. Thus, many of the prior art hot melt adhesives are no longer available.

3. While flame retardancy was a property incorporated into many prior art hot melt adhesives, few if any contained components intended to reduce smoke generation. In view of many current environmental and occupational health standards, smoke suppression has become an important factor in the formulation of hot melt adhesives.

4. Prior art hot melt adhesives have a definite "tack" or stickiness at room temperature. When these have been used to coat sheet materials which are commonly rolled for storage or shipment (and are therefore referred to as "roll goods") it has been necessary to take steps to prevent the sticky adhesive on one layer of the roll from adhering to the sheet which forms the next layer of the roll. Such means have included incorporating paper separators as part of the roll and/or dusting the sheet surface with materials such as talc. This of course adds substantial additional fabrication and material costs as well as incorporating into the roll goods materials such as separating paper and talc which are not needed for the end use of the roll goods and therefore must be removed and discarded by the user.

5. In many instances, hot melt adhesives are applied to sheets to form adhesive jacketing materials which are placed as facings for building materials and thermal insulations. The jacketed products are frequently used outdoors or in other environments where they are subjected to humidty and/or low temperatures. Heretofore, however, the hot melt adhesives themselves could not serve as vapor barriers or provide resistance to "cold cracking" in low temperatures. Thus vapor barriers had to be provided by additional coatings, jacketings, etc., obviously at additional cost. Care also had to be taken to provide supplemental adhering means if low temperatures were expected. Alternatively, cold cracking often caused hot melt adhesives to be rejected for use in many applications where they would otherwise have been quite suitable.

6. Finally, many hot melt adhesives can be applied only as continuous films or sheets to the substrate on which they are coated. They are not amenable to being applied in discrete segments, as in the form of small discrete dots or lines of adhesive on a substrate. Thus, where discrete areas of adhesive would provide adequate adhesive strength to bond the substrate to another material, the required use of a continuous film of adhesive represents unnecessary added cost and waste of material.

SUMMARY OF THE INVENTION

The invention herein is a flame-retardant, low-smoke, hot melt adhesive particularly suitable for use in bonding materials such as fibrous thermal insulations to facing sheets. It consists essentially of, in parts by weight, 11-45 parts of high melt point paraffin wax; 10-40 parts of halogenated microcrystalline or paraffin wax; 0.3-10 parts of halogen scavenger; 5-20 parts of synergistic flame suppressant; 5-20 parts of a low temperature resistant vapor barrier elastomer and 0.5-10 parts of smoke suppressant. In a preferred embodiment the composition also contains 5-20 parts of a carbon dioxide donor which may also serve as a filler. In particularly preferred embodiments the high melt point paraffin wax will be a fully refined paraffin wax with a melt point in the range of 200°-225°, the halogen will be chlorine, the synergistic flame suppressant will be a heavy metal oxide, the vapor barrier elastomer will be an ethylene vinyl acetate polymer and/or the smoke suppressant will be an organo-iron compound. The preferred carbon dioxide donor will be calcium carbonate.

DETAILED DESCRIPTION AND PREFERRED EMBODIMENTS

The first major component of the present invention is a high melt point paraffin wax. This will normally be a wax with a melt point on the order of 200° F. (93° C.) or higher, preferably in the range of about 200°-225° F. (93°-107° C.). Particularly preferred are fully refined paraffin waxes having melt points of approximately 210° F. (99° C.). The paraffin wax will be present as from 11-45 parts by weight of the composition, preferably about 25-45 parts by weight. The presence of the high melt point paraffin wax is critical to the present invention, for if conventional low melt point (less than 200° F. (93° C.) paraffin waxes are used the composition will have the stickiness or tackiness objectionable in the prior art materials.

The second major component of the present invention is an halogenated microcrystalline or paraffin wax which serves as a halogen donor at elevated temperatures. Normally this will be a chlorinated or brominated wax and the chlorinated materials are preferred because of their greater reactivity and lower cost. A variety of halogenated waxes are available commercially. Those that are suitable for the present invention are ones containing approximately 50-70% by weight of halogen, preferably chlorine. The halogenated paraffin will be present in the present composition as from 10-40 parts by weight, preferably 20-30 parts by weight.

A minor but critical component in the present invention is a halogen scavenger, which will be present as from 0.3-10 parts by weight, preferably from 0.3-1.5 parts by weight. This material serves to scavenge excess halogen which is donated by the halogenated paraffin and thus increases the stability of the hot melt at higher temperatures. A material which has been found particularly suitable for this use is epoxidized soya oil.

Also present in the composition will be a flame suppressant which cooperates synergistically with the halogen donor to extinguish any flame generated upon ignition. This material will normally be present as from 5–20 parts by weight of the composition, preferably 5–15 parts by weight. Heavy metal oxides have proven to be quite satisfactory flame suppressants. One material which has been found to be particularly preferable is antimony trioxide.

Another component of the present invention will be a vapor barrier elastomer which provides both moisture vapor barrier properties and "cold crack" resistance at low temperatures. Suitable for this use are acid terpolymer elastomers such as acidic ethylene vinyl acetate based terpolymers. This component will be present as 5–20 parts by weight, preferably 8–15 parts by weight, of the composition.

The final component of the composition will be a smoke suppressant. This will be present in amounts from 0.5–10 parts by weight, preferably 1–5 parts by weight. A material which has been found to be satisfactory as a smoke suppressant in the present invention is an organometalocene which is formed by reacting ferrocene and chlorinated paraffin.

In addition, it is frequently desirable to include carbon dioxide donors in the composition, particularly those which also serve as fillers. Decomposable carbonates are quite suitable for this role. Particularly preferred is calcium carbonate, both because it decomposes readily upon heating and also because it is quite expensive and very satisfactory as a filler. The carbon dioxide donor will be present in amounts of from 5–25 parts by weight, preferably 5–15 parts by weight.

The hot melt adhesive composition of this invention remains stable at temperatures on the order of 300°–350° F. (150°–175° C.) for extended periods of time, i.e., substantially longer than six hours. The material is not tacky or adherent after application and cooling and can be described as a "hard" material. However, it can be readily reactivated as an adhesive by heating the substrate. Thus it is ideally suited as an adhesive for roll goods since it is applied hot, cooled to form the hard material prior to rolling and then the rolled material can be shipped and stored easily for indefinite periods while yet be readily reactivated by the end user at the appropriate time. Also, the hot melt adhesive generates no objectionable or harmful quantities of smoke.

Application of the hot melt adhesive to sheets such as facing substrates and the like can be accomplished by conventional slot coaters which form a thin continuous film of adhesive which extrudes onto a moving sheet of substrate. More preferably, however, the adhesive is applied in discrete units such as dots or stripes to the moving substrate. This allows placement of the optimum amount of adhesive material on the substrate for the particular end use envisioned. It will be understood that when applied in discrete units rather than continuous films the material of this invention does not serve as a vapor barrier, because of the void spaces between the units. However, the terpolymer component still imparts cold crack resistance.

In an example of the composition of the present invention, a material was prepared using the following components, listed as parts by weight:

| | | |
|---|---|---|
| 210 ° F. melt point paraffin wax | 39.8 | parts |
| chlorinated paraffin wax | 25.5 | parts |
| epoxidized soya oil | 0.7 | parts |
| antimony trioxide | 9.6 | parts |
| ethylene vinyl acetate acid terpolymer (a) | 11.9 | parts |
| calcium carbonate | 9.6 | parts |
| ferrocene/chlorinated paraffin reaction product (b) | 2.9 | parts |
| | 100.0 | parts |

(a) "Elvax 4260," trademarked proprietary product of E. I. duPont de Nemours & Co.
(b) "DFR-100," commercial product of Arapahoe Chemical Co.

The product with this formula was applied to a foil/-kraft facing material using commercial coating equipment to apply the adhesive in the form of discrete dots of varying sizes spread across the facing sheet. The sheet containing the dots of adhesive was rolled after the adhesive had cooled using conventional rolling equipment. It was later found to be readily capable of being unrolled without any significant tearing or adhesion of the adhesive to adjacent layers of facing. Thereafter, the unrolled facing was applied to glass fiber thermal insulation by heating the facing to reactivate the hot melt adhesive and adhering the facing to the glass fiber while the adhesive was still hot. No subsequent delamination occurred.

What is claimed is:

1. A flame retardant, low-smoke, hot melt adhesive composition which consists essentially of, in parts by weight,

| | | |
|---|---|---|
| high melt point paraffin wax | 11–45 | parts |
| halogenated paraffin | 10–40 | parts |
| halogen scavenger | 0.3–10 | parts |
| flame suppressant synergist | 5–20 | parts |
| low temperature resistant vapor barrier elastomer | 5–20 | parts |
| smoke suppressant | 0.5–10 | parts |

2. A composition as in claim 1 further consisting essentially of 5–20 parts by weight of a carbon dioxide donor.

3. A composition as in claim 1 wherein said paraffin wax has a melt point above about 200° F.

4. A composition as in claim 3 wherein said paraffin wax has a melt point in the range of about 200°–225° F.

5. A composition as in claim 1 wherein the halogen in said halogenated paraffin is chlorine or bromine.

6. A composition as in claim 5 wherein said halogen is chlorine.

7. A composition as in claim 6 wherein said halogen scavenger is a chlorine scavenger.

8. A composition as in claim 1 wherein said flame suppressant synergist is a heavy metal oxide.

9. A composition as in claim 1 wherein said elastomer is an acid terpolymer.

10. A composition as in claim 2 wherein said carbon dioxide donor also functions as a filler.

11. A composition as in claim 10 wherein said carbon dioxide donor is a decomposable carbonate.

12. A composition as in claim 1 consisting essentially of, in parts by weight,

| | | |
|---|---|---|
| high melt point paraffin wax | 25–45 | parts |
| chlorinated paraffin wax | 20–30 | parts |
| chlorine scavenger | 0.3–1.5 | parts |
| heavy metal oxide | 5–15 | parts |

-continued

| | |
|---|---|
| acid terpolymer vapor barrier elastomer | 8-15 parts |
| smoke suppressant | 1-5 parts |

13. A composition as in claim 12 further consisting essentially of 5 to 15 parts by weight of a carbon dioxide donor.

14. A composition as in claim 13 wherein said carbon dioxide donor also functions as a filler.

15. A composition as in claim 12 consisting essentially of, in parts by weight,

| | |
|---|---|
| 210° F. melt point parafin wax | 39.8 parts |
| chlorinated paraffin | 25.5 parts |
| epoxidized soya oil | 0.7 parts |
| antimony trioxide | 9.6 parts |
| ethylene vinyl acetate acid terpolymer | 11.9 parts |
| ferrocene/chlorinated paraffin reaction product | 2.9 parts |

16. A composition as in claim 15 further consisting essentially of 9.6 parts by calcium carbonate.

17. A substrate having deposited thereon the composition of claim 1.

18. A substrate as in claim 17 wherein said composition is deposited as discrete units of material.

19. A substrate as in claim 17 wherein said composition is deposited as a continuous coating.

20. A substrate having deposited thereon the composition of claim 2.

21. A substrate as in claim 20 wherein said composition is desposited as discrete units of material.

22. A substrate as in claim 20 wherein said composition is deposited as a continuous coating.

23. A substrate having deposited thereon the composition of claim 15.

24. A substrate as in claim 23 wherein said composition is deposited as discrete units of material.

25. A substrate as in claim 23 wherein said composition is deposited as a continuous coating.

* * * * *